United States Patent
Chen et al.

(10) Patent No.: US 10,877,973 B2
(45) Date of Patent: Dec. 29, 2020

(54) METHOD FOR EFFICIENT ONE-TO-ONE JOIN

(71) Applicant: NEC CORPORATION, Tokyo (JP)

(72) Inventors: Ting Chen, Tokyo (JP); Takuya Araki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 706 days.

(21) Appl. No.: 15/507,317

(22) PCT Filed: Sep. 9, 2014

(86) PCT No.: PCT/JP2014/074336
§ 371 (c)(1),
(2) Date: Feb. 28, 2017

(87) PCT Pub. No.: WO2016/038749
PCT Pub. Date: Mar. 17, 2016

(65) Prior Publication Data
US 2017/0308578 A1 Oct. 26, 2017

(51) Int. Cl.
*G06F 17/30* (2006.01)
*G06F 16/2455* (2019.01)
*G06F 16/28* (2019.01)

(52) U.S. Cl.
CPC ........ *G06F 16/2456* (2019.01); *G06F 16/284* (2019.01)

(58) Field of Classification Search
CPC .................. G06F 16/2456; G06F 16/284
See application file for complete search history.

(56) References Cited

U.S. PATENT DOCUMENTS

| | | | |
|---|---|---|---|
| 7,836,107 B2* | 11/2010 | Gandhi | G06F 16/10 707/823 |
| 9,405,814 B1* | 8/2016 | Kapoor | G06F 16/256 |
| 2003/0126398 A1* | 7/2003 | Shinozaki | G06F 12/145 711/206 |
| 2005/0021503 A1* | 1/2005 | Chiang | G06F 16/24542 |
| 2006/0288030 A1 | 12/2006 | Lawrence | |
| 2015/0088939 A1* | 3/2015 | Tran | G06F 16/23 707/810 |

(Continued)

FOREIGN PATENT DOCUMENTS

| | | |
|---|---|---|
| CN | 102508924 A | 6/2012 |
| JP | 11-96190 A | 4/1999 |

OTHER PUBLICATIONS

Communication dated Mar. 7, 2018 from the Japanese Patent Office in counterpart application No. 2017-513274.

(Continued)

*Primary Examiner* — Huawen A Peng
(74) *Attorney, Agent, or Firm* — Sughrue Mion, PLLC

(57) ABSTRACT

One-to-one join is widely used in machine learning and business intelligent applications. Disclosed herein is an efficient method for one-to-one join to reduce memory usage and thus disk I/O accesses with limited memory. Disclosed method outputs and removes a pair of tuples immediately when they are matched to each other to allow join results to be generated without reading entire tables. Meanwhile, disclosed method increases matching rate for in memory blocks through the predication of data distribution patterns based on both statistics and history block matching information.

14 Claims, 9 Drawing Sheets

(56) References Cited

U.S. PATENT DOCUMENTS

2016/0378824 A1* 12/2016 Li ..................... G06F 16/2255
                                                    707/715

OTHER PUBLICATIONS

Nakano et al., "GN Hash-Based Join Algorithm and Its Performance Evaluation", Transactions of Information Processing Society of Japan, vol. 35, No. 9, Sep. 1994, pp. 1861-1873. (16 pages total).
Michael Henderson et al.; "Exploiting Join Cardinality for Faster Hash Joins"; Symposium on Applied Computing; Mar. 8-12, 2009, pp. 1549-1554.
Ramon Lawrence: "Early Hash Join: A Configurable Algorithm for the Efficient and Early Production of Join Results", VLDB '05 Proceedings of the 31st International Conference on Very Large Databases, Trondheim, Norway, Aug. 30, 2005, pp. 841-852.
International Search Report for application No. PCT/JP2014/074336 dated May 7, 2015.
Written Opinion for application No. PCT/JP2014/074336 dated May 7, 2015.

* cited by examiner

METHOD FOR EFFICIENT ONE-TO-ONE JOIN

CROSS REFERENCE TO RELATED APPLICATIONS

This application is a National Stage of International Application No. PCT/JP2014/074336 filed Sep. 9, 2014, the contents of all of which are incorporated herein by reference in their entirety.

TECHNICAL FIELD

The present invention relates to the field of database engineering, and more particularly to joining technique.

BACKGROUND ART

Join is the most frequently used operation in relational database systems. It combines records (tuples, rows) from two of more tables (relations) by using values common to each table. Based on the number of matched records in table B for a record in table A, join operation usually has different cardinality, such as one-to-one, one-to-many and many-to-many. One-to-one join indicates that for each tuple in each table at most has one matched tuple in another table. Hash join is one of the most popular algorithm for join operation. It involves two phases, build and probe. In build phase, it reads the entire smaller relation from disk to memory and builds a hash table for the table whose entries consist of the join attribute and its tuple. Once the hash table is built, it performs probe phase which scan the larger relation and find the relevant rows from the smaller relation by looking in the hash table.

Although Join operation is frequently used, it is also the most expensive or time-consuming operation mainly due to file I/O access cost. Especially, when large tables are involved and the available memory is limited, more I/O accesses are necessary to reduce the memory usage. For example, with enough memory, hash join algorithm on two tables first reads the smaller table into memory, builds a hash table for its records, and then read the larger table and find the relevant records from the smaller table by looking into the hash table. Thus, it only involves reading two tables from disk once. On the other hand, with limited memory, the algorithm has to avoid reading the entire table into memory, so it reads tables block by block, partitions them through the same hash function on the join key and write the partitions out to disk. The algorithm then loads pairs of partitions into memory, builds a hash table for the smaller partitioned table, and probes another table for matches with the current hash table. Thus, this algorithm needs to read two tables twice and write them to disk once. With limited memory, the I/O accesses is three times of that with infinite memory. Therefore, reducing memory usage can effectively reduce the I/O cost, thus reducing the computation time.

Nowadays, join operation are widely used in many applications such as machine learning, business intelligent and natural language processing because database systems are increasingly used in these fields due to the powerful SQL (Structured Query Language) and their high performance. Machine learning as an important tool for big data analysis has gotten more and more attention. The process for machine learning is mainly composed of data preprocessing, data learning and predicting. Many data analysts tend to rely on database systems for the data preprocessing to reduce human interference and get better performance. Feature engineering is one of the most important step in preprocessing. It includes feature generation which is to generate new features from raw data using domain-specific operations and feature combination which is to combine all newly generated features to be the input of the learning phase. In a relational database, raw data is stored as a table consisting primary keys and other attributes and features are stored in one or more tables consisting of same primary keys and corresponding features. Thus, feature combination is actually join operation on feature tables and original table using the primary keys.

The characteristic of join in feature combination is one-to-one matching because the join key is primary keys which have unique values. Such one-to-one join commonly happens when two tables are joined on unique keys. Another example exists in business intelligent application. Bringing data not covered by the pre-built routines from new data sources is a common task in BI applications, such as adding new columns, rows and tables. To add additional columns, the system usually first creates a new table for additional columns and then performs join of the new table and the old table on unique attribute values to keep the data granularity and avoid duplicate errors.

Thus our invention targets to provide one-to-one join which can be efficiently used in such applications. To our best knowledge, there is no good work special for one-to-one join. Symmetric hash join (SHJ) shares a same idea with our invention that it keeps two hash tables for two tables respectively and outputs matched records as soon as possible. However, it still needs to keep the entire tables into memory and thus requires large memory. One optimization of SHJ is early hash join (EHJ) which considered the method to select some partitions to be written in disk and the method to avoid duplicate matched results. It mainly considered 1-to-many and many-to-many join. Then another work which is an improvement of EHJ proposed an algorithm to automatically detect the join cardinality (1-to-1, 1-to-N, N-to-1, N-to-N). Based on different join cardinality, there are different duplicate detection methods. For example, if it is 1-to-1 join, the matched tuples for both tables can be immediately discarded. This idea is very similar to our invention, but there still exists many differences. For example, their work does not take data distribution into consideration, thus it cannot improve the matching rate for currently read records and avoid to create hash tables when two tables are stored in the database consistently on the join key. In addition, their work cannot control the usage of memory with a user-defined parameters.

Therefore, we propose an efficient one-to-one join algorithm which uses hierarchical symmetric hash join with consideration of data distribution, reducing the memory usage and thus minimizes processor and I/O costs.

It is an object of this invention to reduce memory usage for performing one-to-one join, allowing more computations to be done with limited memory.

It is another object of this invention to reduce disk access I/O for one-to-one join by reducing the memory usage.

Still other objects and advantages of the invention will in part be obvious and will in part be apparent from the specification and drawings.

SUMMARY OF THE INVENTION

The method disclosed herein is an improved hash-join algorithm, also referred as hierarchical symmetric hash join, specially designed for one-to-one join that consume less memory and thus reduce disk IO accesses with limited memory than other join algorithms. One-to-one join is widely used in data analysis especially feature engineering in machine learning applications and business intelligent applications. Taking advantage of the characteristic of one-to-one join that is for each tuple in a table, there is at most one matched tuple in another table, the disclosed method herein outputs and removes a pair of tuples immediately when they are matched to each other. It keeps in memory a hash table and an one-entry table (1-ET) for each table. Every time a block of data is read to memory and then a tuple from the block is loaded to 1-ET. The disclosed method first compares tuples in both 1-ETs. The two tuples is outputted and removed from the memory if they are matched. Otherwise, they are inserted into its hash table. This process allows join results to be produced without building any hash tables when two tables are sorted or consistently stored based on the join keys.

Wherein the disclosed method, when tuples in two 1-ETs are not matched, they are inserted into their own hash tables respectively. Before that, each tuple is probed to the hash table of its counterpart table, which may generate and then remove join results. Thus it avoids the insertion of tuples to hash tables and reduces the size of hash tables. This process allows join results to be generated before reading either entire table.

The disclosed method provides an $\alpha$-algorithm to allow the user to adjust memory usage. A user registers a parameter $\alpha$ to the system to indicate that at most $\alpha$ of blocks for each table can be kept in memory at the same time. If such limitation is achieved when performing original algorithm, all tuples are partitioned to buckets and written to disk when the buckets are full. Before a tuple is partitioned to a bucket, it first is probed to the hash table of another table to check whether there is a matched tuple existing. If so, the matched tuples are outputted and removed from memory and it does not need to partition the tuple into a bucket. After all tuples of two tables are partitioned to buckets, each bucket is loaded to memory and processed using original algorithm one by one.

The disclosed invention increases matching rate for blocks in memory through the prediction of data distribution based on history block matching information. According to the order of keys to be joined, the disclosed method considers three kinds of data distribution, including consistent ordering, random ordering and reverse ordering. Consistent ordering indicates the order of join keys in two tables are the same, e.g. join keys are sorted in the same way. In feature engineering, it is common that join keys of two tables are in consistent ordering but not sorted because one table is usually created by retrieving another table and applying some feature generation function on some of its attributes. Random ordering indicates that the order of join keys in two tables are random while reverse ordering shows their orders are reversed in two tables. Disclosed method records the matching rate of every previous processed blocks and uses such information to predicate data distribution. After the type of data distribution is fixed, the way of reading blocks for two tables from disk can be adjusted, as well as reading tuples from current blocks to 1-ET. In this case, disclosed method increases matching rate for blocks, thus further reducing memory usage.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

The present invention may be understood more readily with numerous details in the following description of preferred embodiments of the invention and the Figures.

The disclosed method is described under the knowledge of relational database. For example, tables or relations in databases have multiple columns and rows. Rows can be also referred to as records or tuples while columns can be referred to attributes. Tuples can be grouped together to form relations. The disclosed method describes join operation in databases which involves outputting tuples from various tables which have common attributes whose values satisfied some specific requirements. It should be understood that the disclosed method is executed by a computer program stored in a non-transitory computer-readable medium cooperating with a processor and the database and therefore the scope of the present invention is extended to a non-transitory computer-readable medium.

The disclosed method supposes that relation R is stored in an area of disk with its tuples arranged in blocks. The blocks containing the tuples of R are known to the system and it is possible to get the blocks one by one. As each block has the same size with each other, they may contain different number of tuples for different tables in accordance with the size of each tuple.

Hierarchical Symmetric Hash-Join Algorithm

A. Hierarchical Data Store

Figure 1:
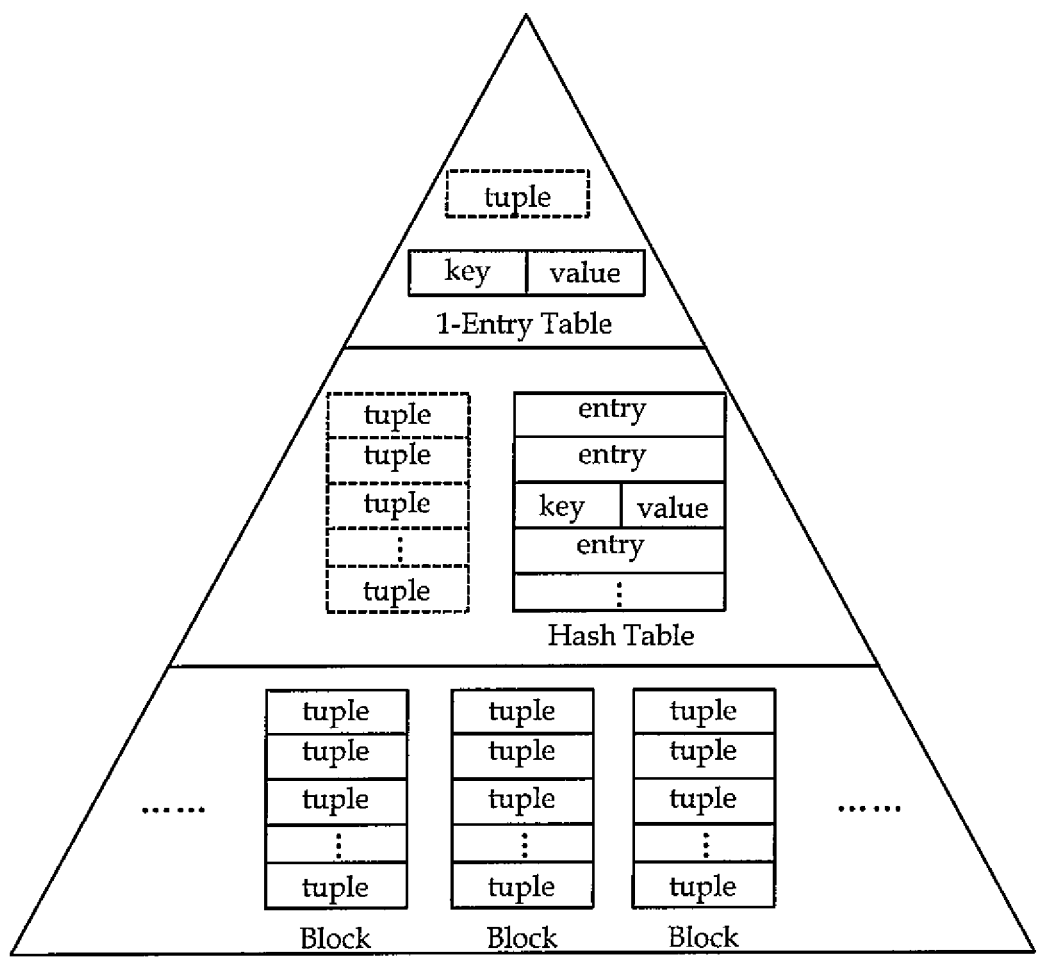
FIG. 1 is a block diagram illustrating the hierarchical storage of data in disclosed method.

In disclosed method, data are stored in a three-level structures as FIG. 1 shows. At the bottom of the structure, relation R is represented as blocks with tuples in disk and one block is read to memory at a time. Thus in the second level, tuples in a block of table already read to memory is stored in a hash table. A hash table has multiple entry with keys and values. Each Key is a value 10a of attribute(s) to be joined and each corresponding value is the tuple with the value 10a. However, not all tuples in the block but only tuples which do not satisfy the requirement of the top-level storage will be inserted into a hash table, which will be described in detail in the next section. The top-level storage is a 1-Entry Table (1-ET) which can only store a single tuple at a time. The entry in 1-ET contains a key and a value. Just like an entry in a hash table, a key is a value of a join attribute or a combination of multiple values of attributes to be joined and the value is the corresponding tuple.

B. Algorithm

Figure 2:
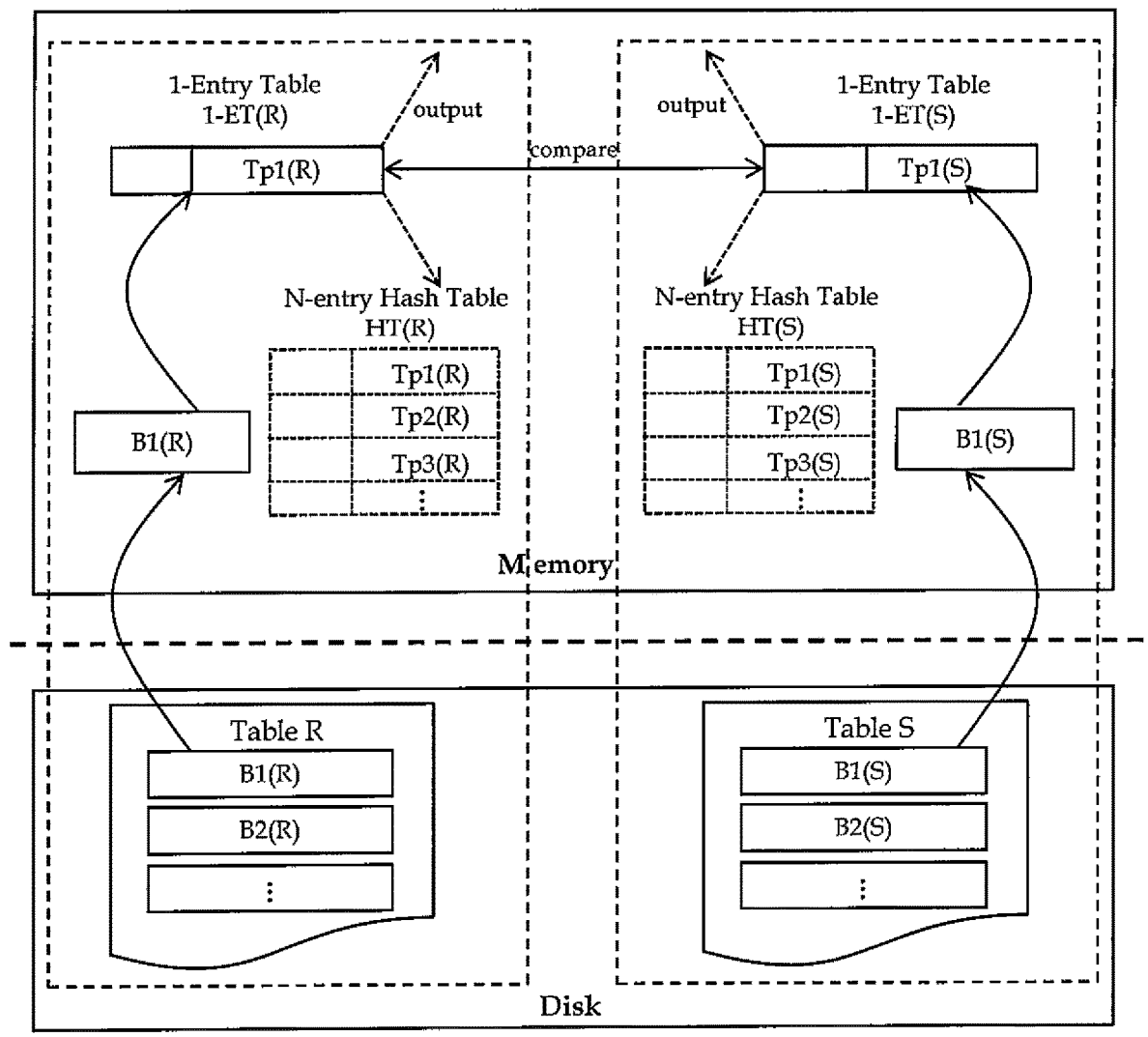
FIG. 2 is a block diagram illustrating the overview of disclosed method.

The essential idea of disclosed method is shown in FIG. 2. First, a block from each table ($B_i(R)$ and $B_i(S)$) is read to memory and a tuple from each of those two blocks ($Tp_i(R)$ and $Tp_j(S)$) are read to 1-ET respectively. Then the two tuples in the two 1-ETs (1-ET(R) and 1-ET(S)) are compared. If they are matched on the join keys, they are removed from memory and outputted to the user. Otherwise, the two tuples will be added into their corresponding hash tables (HT(R) and HT(S)). Before a tuple is inserted to a hash table, it is firstly probed to another hash table to check whether there is a matched tuple. This process will be described in detail later. After all tuples are processed, next block is read to memory and the whole process is repeated until all blocks of any table are finished.

Figure 3:
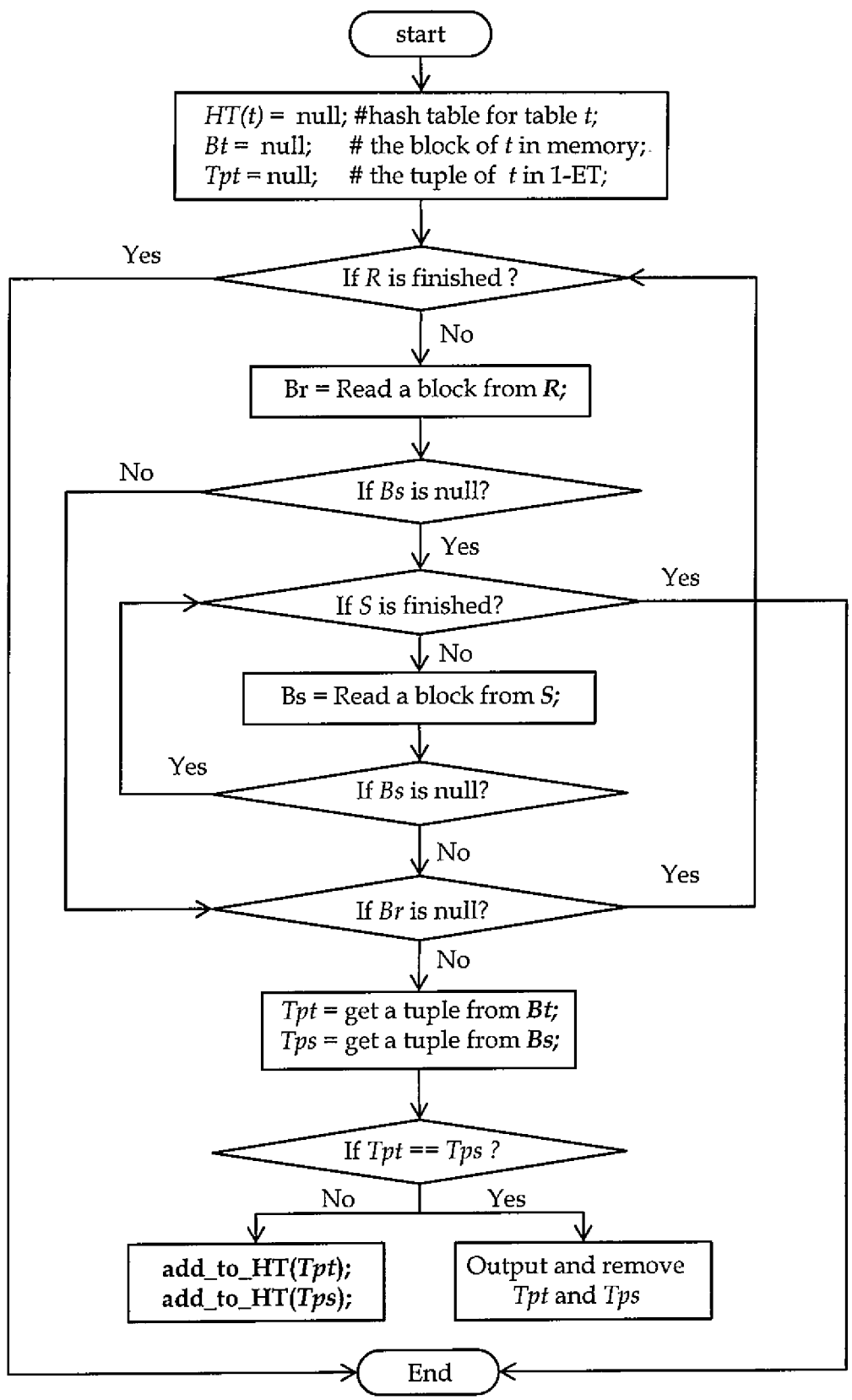
FIG. 3 is a logic flow diagram illustrating the overall of disclosed hierarchical symmetric hash-join algorithm.
Figure 4:
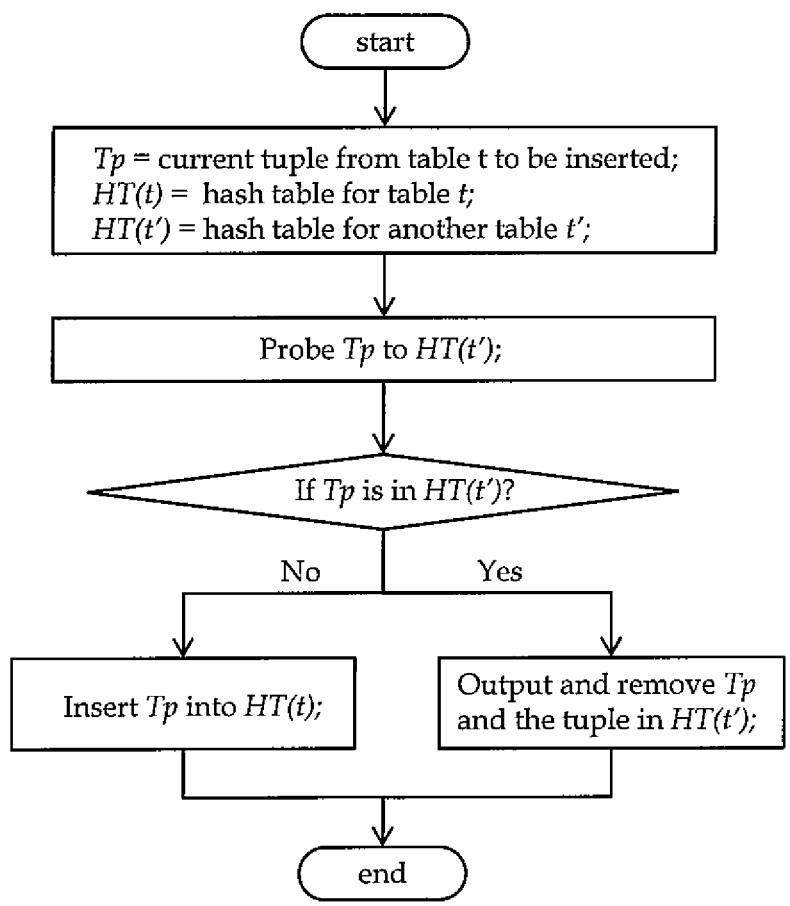
FIG. 4 is a logic flow diagram illustrating a process of tuple insertion to a hash table in the operation of disclosed method.

The detail of the algorithm is shown in the logic flow chart FIG. 3. Two blocks from both tables are not always read at the same time. As the number of tuples in blocks of the two tables are not always the same, it is sometimes that one block is finished while some tuples from another block are still not processed. In this case, the next block from the table that whose previous block is finished will be read to memory. The way to read next block to memory and read next tuple to 1-ET will be described in next section. After two tuples are read to 1-ETs, a comparison is conducted on the key of each 1-ET. If they are not equal, the tuples will be added to the corresponding hash tables. Disclosed method keeps a hash table for each table and tuples from table R are added to the hash table of R. The algorithm for adding a tuple to a hash table is described in FIG. 4. HT(R) and HT(S) are the hash tables for two tables R and S respectively. When a tuple from R denoted as $Tp_i(R)$ is added to HT(R), it first is probed to HT(S). If there is a matched tuple in HT(S) denoted as $Tp_j(S)$, it is removed from HT(S) and the matched tuples are outputted to the user. Otherwise, $Tp_i(R)$ is inserted to HT(R) by hashing on join keys. Such processes are repeated until all tuples in a table are outputted.

C. α-algorithm for Finite Memory

Essential algorithm is described above. However, it requires to fill whole tables into memory in the worse situation. Thus, for finite memory, especially small memory, above algorithm may not work. Disclosed method provides α-algorithm to deal with the problem of limit memory.

The key idea behind α-algorithm is to adjust the memory usage flexible through a parameter α which are provided by the user. The user registers α to the system based on the data properties, such as data size, data distribution pattern and so on. α means that at most α of blocks for each table can be kept in memory at the same time. For example, if table R has 100 blocks in total and α is 0.2, only 20 blocks of R can be kept in memory at the same. In other words, as blocks in memory are stored in a hash table, the size of hash table for R should be smaller than 20 times of block size.

Figure 5:
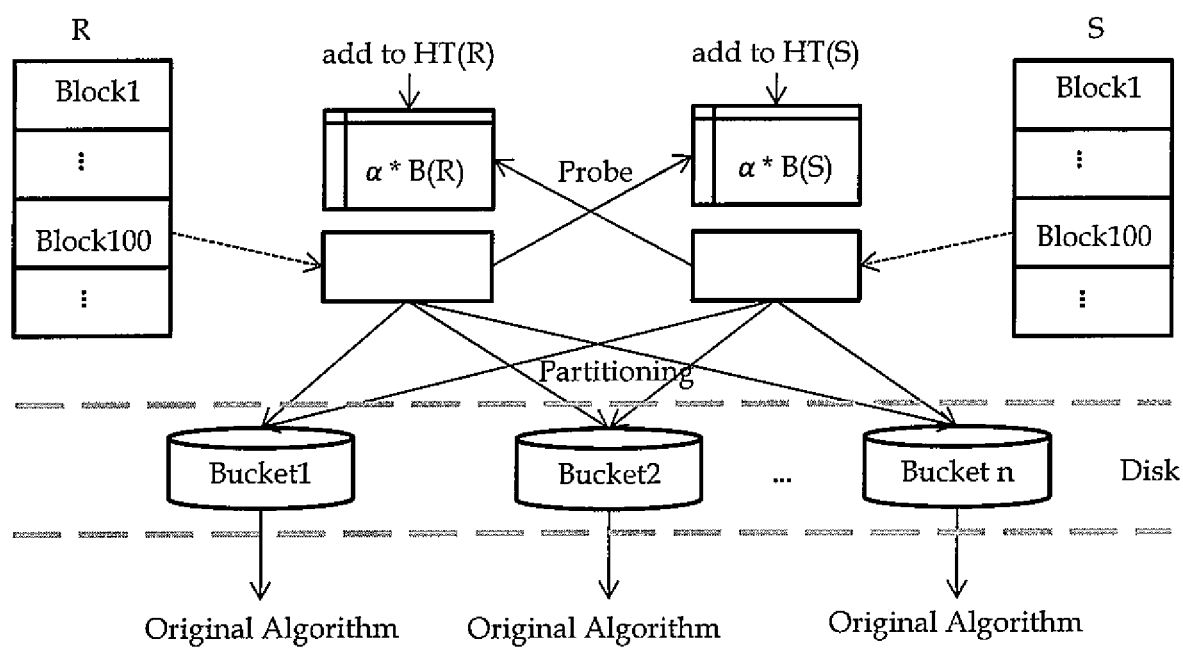
FIG. 5 is a diagram illustrating a process of performing one-to-one join with limitation of memory using $\alpha$-algorithm.

FIG. 5 shows the detail of α-algorithm. At first, the algorithm works as the original algorithm described above. After too many tuples are inserted into the two hash tables, the size of them achieve the limitation defined by α. In this case, next time we will not add new tuples into the hash table any more. All subsequent tuples that tend to be added to the hash tables are partitioned to several buckets based on join keys. Tuples from two tables have to be partitioned with the same method to make sure that all tuples that have same join keys are in the same buckets. Before a tuple from table R is partitioned to a bucket, it is probed to the hash table HT(S) to check whether it already has a matched tuple in HT(S). If so, it does not need to be partitioned to a bucket any more but just be outputted. After all tuples from two tables are partitioned to buckets, tuples belong to a single bucket and are loaded to memory and processed. All buckets are processed one by one and for each one, the original algorithm is used.

Optimization Based on Data Distribution

A. Data Distribution Patterns

Figure 6:
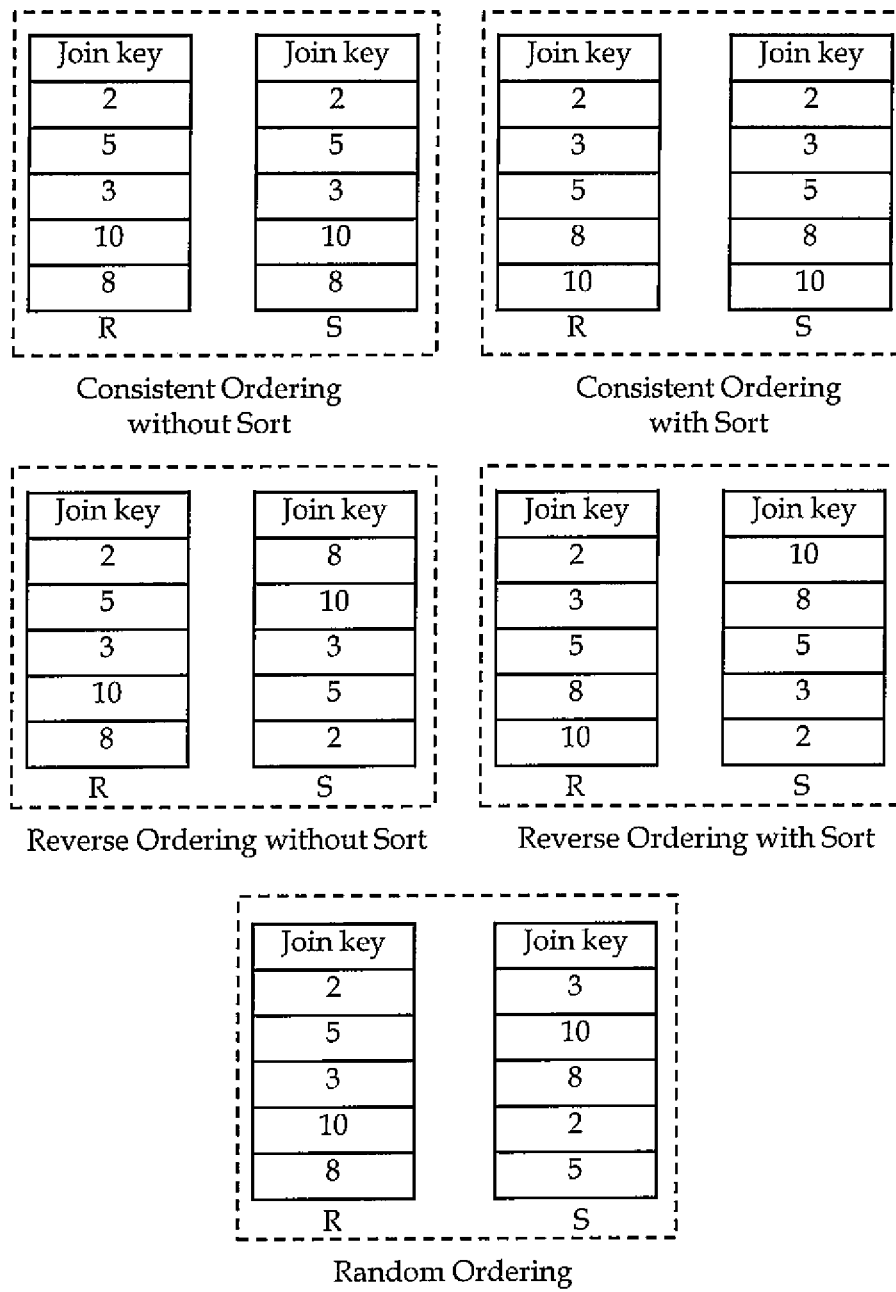
FIG. 6 is a diagram illustrating examples of different data distribution patterns.

Data distribution in disclosed method means that how tuples of the two tables are distributed based on the join keys, in other words, the order of tuples based on the join keys. It indicates the relationship between the two tables' distributions other than each independent table's distribution. Three kinds of data distribution are taken into consideration: consistent ordering (CO), random ordering (RO) and reverse ordering (EO). Consistent ordering means that join keys are ordered in the same way for the two tables. It includes two cases: consistent ordering with sort (COwS) which sorts join keys of the two tables in the same order such as ascending and descending, and consistent ordering without sort (COw/oS) in which join keys are not sorted but in a consistent order. The latter requires the two tables have the same number of tuples and it is very common in the context of feature engineering. The original table is usually not sorted on the primary keys but all generated tables have the same order on the primary keys with the original table. Random ordering indicates that tuples of the two tables are randomly distributed based on join keys. Finally, reverse ordering shows that tuples of the two tables are located reversely based on join keys. Like in consistent ordering, join keys can be either reversely sorted (rEverse Ordering with Sort, EOwS) or not sorted (rEverse Ordering without Sort, EOw/oS) in reverse ordering. FIG. 6 shows some examples of data distribution patterns.

As the essential idea for reducing the memory usage in disclosed method is to evict matched tuples as soon as possible, the data distribution pattern can heavily affect the matching rate for tuples who have already read to memory, thus affecting the overall efficiency. For example, if two tables are in consistent ordering and blocks from two tables are read to memory in the same way, each tuple from a block $B_i(R)$ of a table can find a matched tuple from a corresponding block $B_i(S)$ of another table. In this case, for every pairs of blocks, all tuples are matched and removed from memory. As a result, only two blocks of memory are required. If two tables are distributed in reverse ordering and blocks from them are still read in the same way, no matched tuples are found for half of each table. Then the system needs to keep half of each table in memory. Therefore, being aware of data distribution patterns is very important and the way for reading blocks should take such patterns into consideration.

Figure 7:
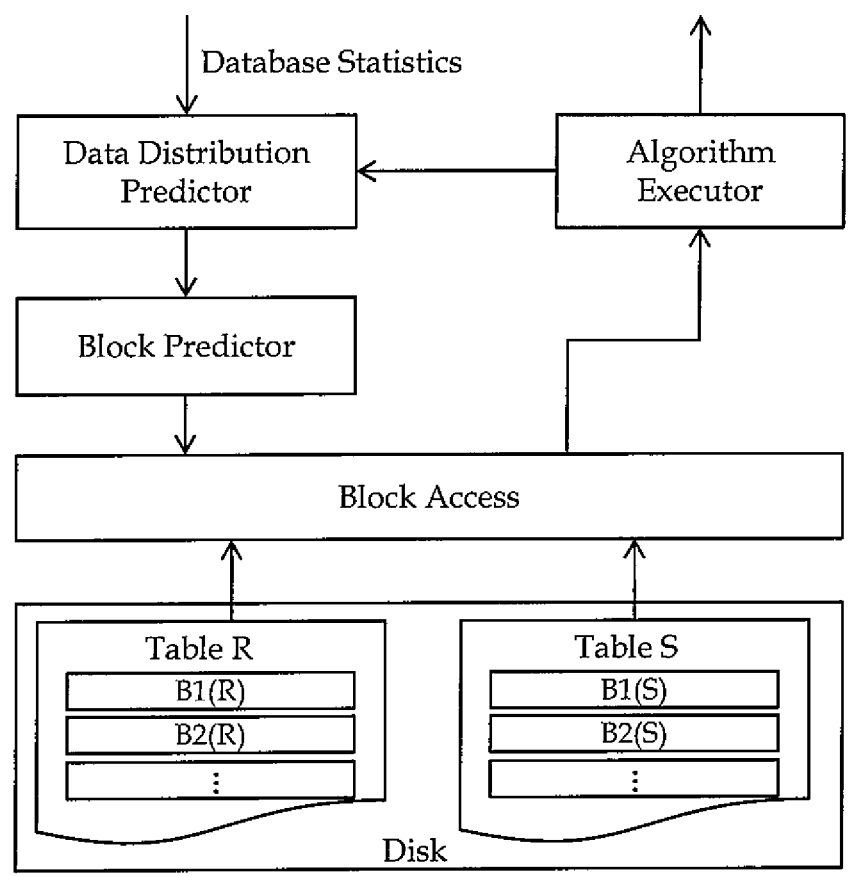
FIG. 7 is a block diagram illustrating a process of accessing a block of table from disk in the operation of disclosed method.

The architecture of disclosed method with consideration of data distribution patterns is shown in FIG. 7. Two components are added. One is Data Distribution Predictor which gets information from both the database metadata store and the runtime Algorithm Executor. Another added component is Block Predictor which accesses blocks from disks based on the data distribution pattern provided by Data Distribution Predictor. The details of these two predictors are described in the next two sections.

B. Prediction for Data Distribution Patterns

Figure 8:
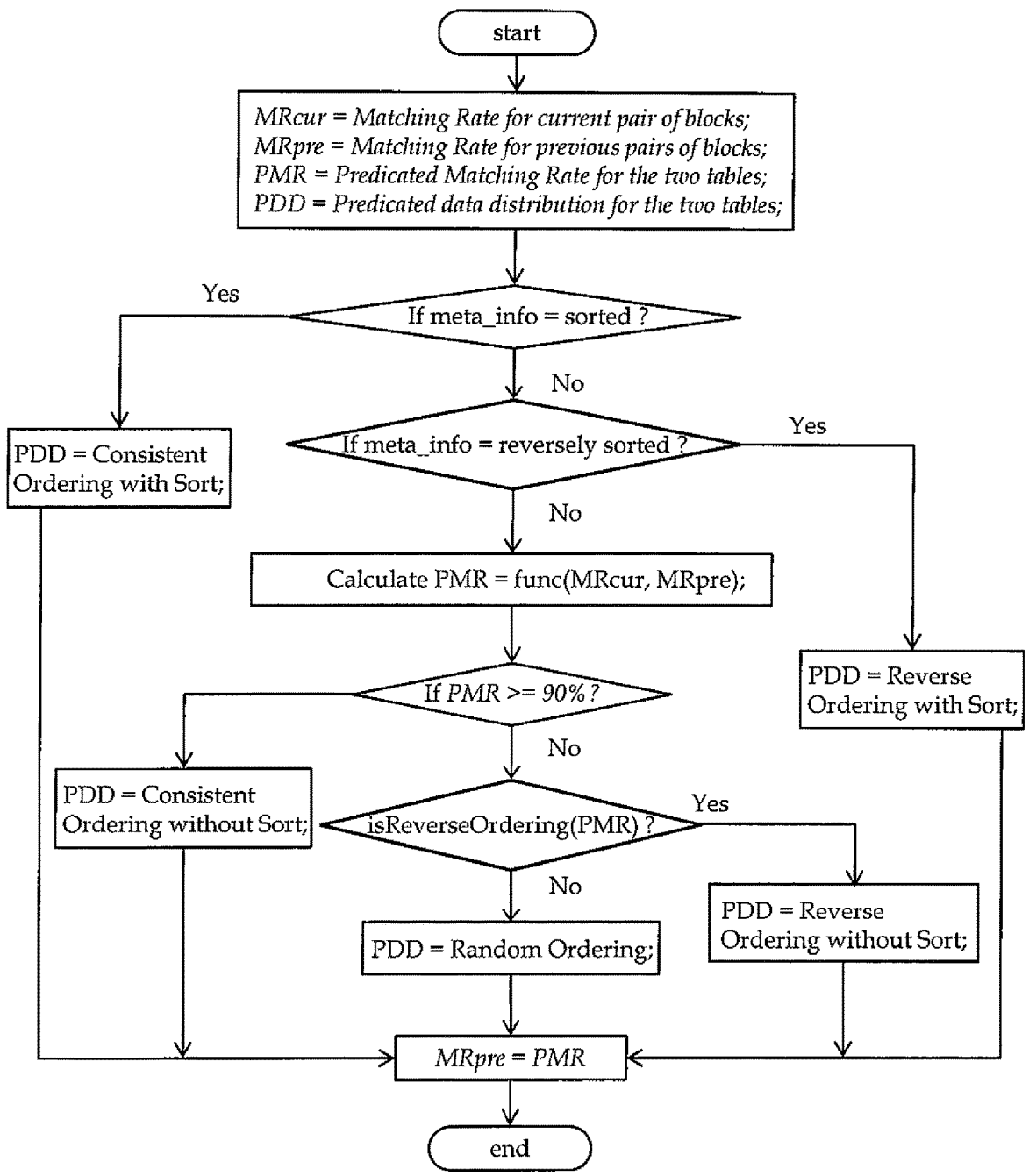
FIG. 8 is a logic flow diagram illustrating prediction process of data distribution for two tables in the operation of disclosed method.

The disclosed method predicts data distribution patterns based on both database statistics and runtime information of matching rate. As FIG. 8 shows, the Data Distribution Predictor first queries about the statistics of the two tables to database metadata store. If the metadata store shows that the two tables are sorted on join keys in the same way, data distribution pattern is set to be Consistent Ordering with Sort. If the two tables are sorted on join keys reversely, data distribution pattern is set to be Reverse Ordering with Sort. Otherwise, when there is no such information from metadata store, disclosed algorithm predicts the data distribution pattern based on the matching rate of blocks which have already been processed.

First, the algorithm gets the matching rate of current block B after this block is processed. In disclosed method, B is the block read into memory from a table with smaller tuples. Block size of each table is fixed, so the number of tuples in each block is different for two tables. For example, if there are 1000 tuples in a block of table R while there are 1200 tuples in a block of table S, block B is defined as one block of table R that is currently read into memory.

The matching rate $MR_{cur}$ for current block B is calculated by the following equation:

$$MR_{cur} = \frac{\text{number of matched tuples}}{\text{number of total tuples}} \quad (1)$$

Then predicted matching rate for subsequent blocks PMR is calculated based on $MW_{cur}$ and the matching rate for previous processed blocks $MR_{pre}$:

$$PMR = \frac{MR_{cur} + MR_{pre}}{2} \quad (2)$$

If the predicated matching rate is larger than 90%, the data distribution pattern is considered to be COw/oS. The algorithm checks if it is Reverse Ordering based on not only the predicated matching rate but also the current predicated data distribution pattern. The function is ReverseOrdering (PMR) works as follows: If the pattern is not decided yet, in other words, the first block is just processed, and the predicated matching rate is smaller than 10%, the algorithm predicts the pattern as Reverse Ordering. If the current pattern is Reverse Ordering and the predicated matching rate is larger than 90%, the pattern is still considered to be Reverse Ordering. This is because after the first time the pattern is predicted as Reverse Ordering, disclosed method changes the way to read the next block (which will be introduced in next section) so that to make the matching rate of next block to become as large as possible. This is consistent with the pattern transformation rule described in the next paragraph. Finally, if data distribution pattern is neither Consistent Ordering nor Reverse Ordering, it is set to be Random Ordering. After that, the algorithm sets the new matching rate value for previous blocks to be the predicated matching rate.

Figure 9:
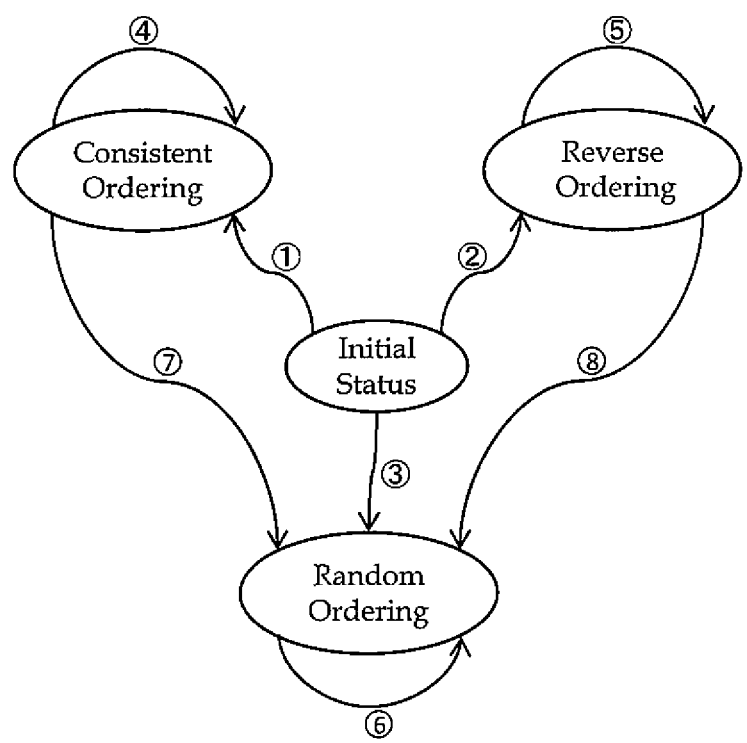
FIG. 9 is a diagram illustrating the transformation of different types of data distribution.

The algorithm produces a reasonable transformation between different data distribution patterns as FIG. 9 shows. As the prediction happens after every smaller block is processed, the results of each prediction may be changed, which is called pattern transformation. First, for transformation 1, 2 and 3 which are started from an initial status, in other words, the first time for pattern prediction, the destination pattern is decided based on the predicted matching rate as described above. When the rate is larger than 90%, it is transformed to Consistent Ordering. When the rate is smaller than 10%, it is transformed to Reverse Ordering. Otherwise, the pattern becomes Random Ordering. Next, each of the three patterns can transform to themselves if their conditions are satisfied (4, 5, 6). For Consistent Ordering and Random Ordering, the conditions for transformation to themselves are not changed. However, for Reverse Ordering, the condition for transformation to itself is not the predicated matching rate smaller than 10 reading next block is changed for Reverse Ordering. Finally, consistent ordering and reverse ordering can be transformed to random ordering, but not the opposite. This is reasonable because for random distributed data, it is possible that a small part of data of two tables is in a consistency or reverse order.

C. Block and Tuple Access Strategy

After the pattern for data distribution is fixed, the disclosed method decides the way to access blocks. Block access means reading blocks from disk to memory. So Block Predictor in FIG. 7 decides which block should be read based on data distribution pattern.

If the data distribution pattern is consistent ordering (either with sort or not), the predictor reads next blocks of both tables sequentially. If the two tables are in reverse ordering, the predictor reads next blocks of the two tables reversely. For example, the first block from table R is read while the last block from another table S is read. Finally, if two tables are randomly distributed, blocks for both tables are read sequentially. Usually, before the pattern is fixed, in other words, before the first block is processed, the predictor decides to read Block 1 of each table into memory and adjusts block access method from next time. As consistent ordering with sort and reverse ordering with sort can be known in advance (before the first block is processed), the first block can be accessed in a right way. For example, for the pattern of reverse ordering with sort, the predictor decides to read Block 1 of table R and Block n from table S (assuming that there are n blocks in total for table S). The information of blocks including block number, blocks that have already been read, the current processing block and so on is kept in metadata store. The predictor can easily access such information and make the decision.

After reading a block of each table into memory, the disclosed method needs to load one tuple to 1-Entry Table of each table respectively. Such process is called tuple access which decides which tuple and when the tuple should be read.

To make the description easier, let's assume that $B_i(R)$ and $B_i(S)$ each with m tuples are just read in memory. If two tables are in consistent ordering, tuples are read from $B_i(R)$ and $B_i(S)$ to their own 1-ETs sequentially. However, if two tables are sorted, not every time new tuples are read to 1-ET at the same time. For example, $Tp_i(R)$ and $Tp_i(S)$ are in their own 1-ETs respectively at this point. If they are matched, they are outputted and $Tp_{i+1}(R)$ and $Tp_{i+1}(S)$ are read to 1-ETs. As for ascending order, if $Tp_i(R)$ is smaller than $Tp_i(S)$, only next tuple from R is continuously read to 1-ETs until it is not smaller than $Tp_i(S)$. For descending order, it is in an opposite situation that if $Tp_i(R)$ is larger than $Tp_i(S)$, only next tuple from R is continuously read to 1-ETs until it is not larger than $Tp_i(S)$. If two tables are in reverse ordering, tuples are read from $B_i(R)$ and $B_i(S)$ to their own 1-ETs reversely. When they are sorted in the reverse order, the way to read tuples is similar to the situation of sorting two tables in same order. If two tables are in random order, the disclosed method skip this step because it is small possibility that two tuples are matched to each other such that the comparison is meaningless and a waste of time.

The invention claimed is:

1. For joining two tables on one-to-one matching attribute, a method comprising:
providing a hierarchical structure for data storage;

assigning two hash tables and two 1-entry tables for the two joined tables respectively, each hash table having multiple entry while each 1-entry table being for storing a single tuple;

reading a block of two tables from disk to memory respectively;

reading a tuple from the two in memory blocks to 1-entry tables respectively, each of the 1-entry tables only storing a single tuple at a time;

comparing tuples in both 1-entry tables on join keys;

outputting the matched tuples and removing them from both 1-entry tables; and adding unmatched tuples to their own hash tables using symmetric probing and hashing, wherein the hash tables are referred to after the 1-entry tables are referred to only when the unmatched tuples are present.

2. The method of claim 1, wherein a hierarchical data storage for a single table comprises:

in the bottom of the structure, storing a table as blocks with tuples in disk and reading one block to memory at a time;

in the second level, storing a block in memory and adding all tuples that cannot satisfy the condition in the top level to a hash tables;

in the top level, storing a tuple in a 1-entry table which stores a single tuple at a time and contains a key which represents join keys and a value which is the corresponding tuple.

3. The method of claim 1, wherein blocks are read into memory and tuples are read to 1-entry tables according to data distribution pattern of the two tables which means how tuples of the two tables are distributed based on join keys and indicates the relationship between the two tables' distributions other than each independent table's distribution.

4. The method of claim 3, wherein data distribution patterns are classified into three categories: Consistent Ordering (with/out Sort), Reverse Ordering (with/out Sort) and Random Ordering.

5. The method of claim 3, wherein data distribution patterns are predicated based on both database statistics and runtime information of matching rate which is the ratio of number of matched tuples to the total number of tuples.

6. The method of claim 5, wherein data distribution patterns predication comprises:

querying about the statistics of the two tables to database metadata store;

determining if the two tables are sorted on join keys in the same way or reversely; and determining data distribution patterns based on the matching rate of blocks which have already been processed if no sorting information can be provided by database statistics.

7. The method of claim 5, wherein data distribution patterns predication based on runtime information of matching rate comprises:

defining a base block as the block that read into memory from a table with smaller tuples than another block from another table;

getting the current matching rate of the base block after it is processed;

calculating predicated matching rate for subsequent blocks based on the matching rate for current block and previously processed blocks;

determining data distribution patterns based on predicated matching rate.

8. The method of claim 1, wherein using symmetric probing and hashing to add a tuple to a hash table comprises:

probing the tuple to the hash table of another joined relation;

checking whether there is a matched tuple in another hash table for the tuple;

outputting matched tuples and delete the matched tuple from the hash table; and inserting the tuple into the hash table by hashing join keys if there is no matched tuple in another hash table.

9. The method of claim 1 further comprising, an algorithm to adjust memory usage by an user with a parameter $\alpha$ which is the ratio of number of blocks that can be kept in memory at the same time to the total number of blocks of a table.

10. The method of claim 9 further comprising:

performing original algorithm for one-to-one join at first; and after the memory usage achieves the limitation of $\alpha$;

probing a tuple to the hash table of the counterpart table to determine if there is a matched tuple existing; and outputting and removing matched tuple from memory if a matched tuple is found; otherwise partitioning tuples to several buckets based on join keys;

writing tuples in each buckets to disk when it is full;

reading each bucket to memory and performing original algorithm one by one after all tuples of two tables are partitioned to buckets.

11. A non-transitory computer-readable recording medium for making a processor execute a method which is used to join two tables on one-to-one matching attribute and which comprises:

providing a hierarchical structure for data storage;

assigning two hash tables and two 1-entry tables for the two joined tables respectively, each hash table having multiple entry while each 1-entry table is for storing a single tuple;

reading a block of two tables from disk to memory respectively;

reading a tuple from the two in memory blocks to 1-entry tables respectively, each of the 1-entry tables only storing a single tuple at a time;

comparing tuples in both 1-entry tables on join keys;

outputting the matched tuples and removing them from both 1-entry tables; and adding unmatched tuples to their own hash tables using symmetric probing and hashing, wherein the hash tables are referred to after the 1-entry tables are referred to only when the unmatched tuples are present.

12. The non-transitory computer-readable recording medium of claim 11, wherein using symmetric probing and hashing to add a tuple to a hash table comprises:

probing the tuple to the hash table of another joined relation;

checking whether there is a matched tuple in another hash table for the tuple;

outputting matched tuples and delete the matched tuple from the hash table; and inserting the tuple into the hash table by hashing join keys if there is no matched tuple in another hash table.

13. The non-transitory computer-readable recording medium of claim 12, the method further comprising an algorithm to adjust memory usage by an user with a parameter $\alpha$ which is the ratio of number of blocks that can be kept in memory at the same time to the total number of blocks of a table.

14. The non-transitory computer-readable recording medium of claim 13, the method further comprising:
   performing original algorithm for one-to-one join at first; and after the memory usage achieves the limitation of α;
   probing a tuple to the hash table of the counterpart table to determine if there is a matched tuple existing; and
   outputting and removing matched tuple from memory if a matched tuple is found; otherwise
   partitioning tuples to several buckets based on join keys;
   writing tuples in each buckets to disk when it is full;
   reading each bucket to memory and performing original algorithm one by one after all tuples of two tables are partitioned to buckets.

\* \* \* \* \*